United States Patent [19]

Goodale

[11] 3,816,663

[45] June 11, 1974

[54] REAL-TIME MULTIPLEXED DIGITAL DATA RECORDING SYSTEM FOR TELEPHONE CENTRAL OFFICE AMA RECORDERS

[75] Inventor: Paul E. Goodale, Pleasant Hill, Calif.

[73] Assignee: E-H Research Laboratories, Inc., Oakland, Calif.

[22] Filed: Nov. 2, 1972

[21] Appl. No.: 303,196

[52] U.S. Cl. .......................... 179/7 MM, 179/15 AM

[51] Int. Cl. .......................................... H04m 15/04

[58] Field of Search ........ 179/7 MM, 15 AM, 9, 10, 179/11, 7.1 R, 7.1 TP

[56] References Cited

UNITED STATES PATENTS

| | | | |
|---|---|---|---|
| 3,051,789 | 9/1962 | Clement | 179/7.1 TP |
| 3,251,045 | 5/1966 | Confeld | 179/7.1 TP |
| 3,560,658 | 2/1971 | Molloy | 179/7.1 TP |
| 3,651,269 | 3/1972 | Le Strat et al. | 179/7.1 R |

*Primary Examiner*—William C. Cooper
*Assistant Examiner*—Gerald Brigance
*Attorney, Agent, or Firm*—Flehr, Hohbach, Test, Albritton & Herbert

[57] ABSTRACT

A real-time multiplexed digital data recording system for replacing one to ten AMA paper perforators of a telephone central office with a magnetic tape system. The system provides a deskewing technique for interfacing with the electromagnetic actuating pulses of the AMA recorder and also provides for reverse reading of the magnetic tape to detect disconnect characters while at the same time maintaining compatability with a standard multi-channel magnetic tape reader.

14 Claims, 6 Drawing Figures

REAL-TIME MULTIPLEXED DIGITAL DATA RECORDING SYSTEM FOR TELEPHONE CENTRAL OFFICE AMA RECORDERS

BACKGROUND OF THE INVENTION

The present invention is directed to a real-time multiplexed digital data recording system for telephone central office automatic message accounting (AMA) recorders.

The present AMA system used in a telephone central office is illustrated in FIG. 1. Incoming lines and outgoing trunks are matrixed by a switching matrix 10 which, for example, in terms of the Bell Telephone System might be of the No. 5 crossbar type. All information regarding calls placed on the outgoing trunks is coupled to an AMA recorder 11 which has a capacity of handling 100 trunks. The AMA recorder 11 provides data on 28 parallel output lines 12. In other words, at a single time each line will contain data which may be in the form of a voltage level such as 0 volts or −48 volts. There are 28 possible bits of information. Thus, one parallel line of data is split up into characters A through F with the A character consisting of three bits and the remaining characters, D through F, five bits. The basic code for the D through F characters is a 0, 1, 2, 4, 7 code where each decimal number is always represented by two out of five bits. The A character is for the purpose of providing four possible codes and, when data is present on any of the other data lines, will always have data present on at least one of its data lines. Thus, in Bell Telephone terminology the 28 data lines may be defined as $A_0$, $A_1$, $A_2$, $B_0$, $B_1$, . . . $B_7$ . . . $F_7$.

When data is present on one of the 28 data lines a voltage pulse is present which has a duration of approximately 50 milliseconds. All of these lines are coupled to individual paper perforators indicated by block 13 which punch a paper tape which is essentially 28 bits wide. Each line of information has a trunk identification since data from various ones of the 100 trunks for a particular AMA recorder are interleaved with one another. Check signal line 14 feeds back information from the paper perforators 13 to the AMA recorder 11 that information has been successfully recorded and the paper advanced for reception of the next line of data. Clock data source 16 provides for timing information to recorder 11 such as the time of placement of the telephone call and the time of disconnect.

The last entry of data information in any telephone call will usually be the disconnect of the outgoing trunk. In actual practice the data is stored on a paper tape for a 24 hour period and then at 3:00 AM a new paper roll automatically replaces the old roll. At this time, the recorder identifies itself placing a particular code on the paper tape.

All the paper rolls of the perforators 13 are taken to a central processing station where their data is readout. However, because of the fact that any outgoing trunk that does not have a disconnect code indicates an incompleted call which cannot be charged for, the paper tape is read in a reverse mode. In other words, the paper tape reader will not enter subsequent data regarding an outgoing trunk unless it first detects a disconnect code. Each subsequent line of data which relates to that particular trunk, of course, always has its trunk identification number as part of the 28 bits of data. The reverse reading technique also eliminates the cumbersome process or rewinding.

The foregoing system as described has the obvious difficulty that the use of paper tape produced by the perforator 13 is impractical where there is a large volume of data generated. This is true from merely the physical standpoint of transferring a large paper roll which is necessary for each 100 outgoing trunks from a central computing office each night. The processing of paper tape rolls is also a lengthy process.

Thus, a magnetic tape system is desirable. However, operation of the system naturally cannot be interrupted and thus the 28 lines of data from the AMA recorder 11 must be effectively utilized in a magnetic tape system. The output pulses produced on the data lines 12 by the AMA recorder 11 are, of course, suitable for the actuation of electromagnetic relays of the paper perforator 13. They are therefore relatively noisy; moreover, the data pulses are extremely longer and less exact in time duration as compared to signals usually recorded on magnetic tape. In addition, since any substitute system must be compatible with the existing paper tape reader in reading in reverse, the magnetic tape must also be read in a reverse mode.

OBJECTS AND SUMMARY OF THE INVENTION

It is, therefore, an object of the invention to provide a real-time multiplexed digital data recording system for telephone central office automatic message accounting recorders.

It is another object to provide a system as above which utilizes a magnetic tape recorder with which several AMA recorders are multiplexed.

It is another object of the invention to provide a recording system as above which adequately interfaces with the present data outputs of AMA recorders.

It is another object of the invention to provide a recording system as above in which the magnetic recording tape may be processed in a manner similar to the prior art paper tape by the central tape reading center.

In accordance with the above objects there is provided a real-time multiplexed digital data recording system for telephone control office automatic message accounting (AMA) recorders. The recorders monitor a predetermined number of trunks and provide parallel data on a plurality of output lines related to calls placed on the trunks. Means are responsive to a preselected group of data lines for indicating the presence of data on at least one of the lines. Time delay means are responsive to the indication of the presence of data for providing a load command a predetermined time after the indication. Memory means sample and store the parallel data from the plurality of output lines in response to a load command from the time delay means.

DETAILED DESCRIPTION OF THE PREFERRED EMBODIMENT

Figure 2A:
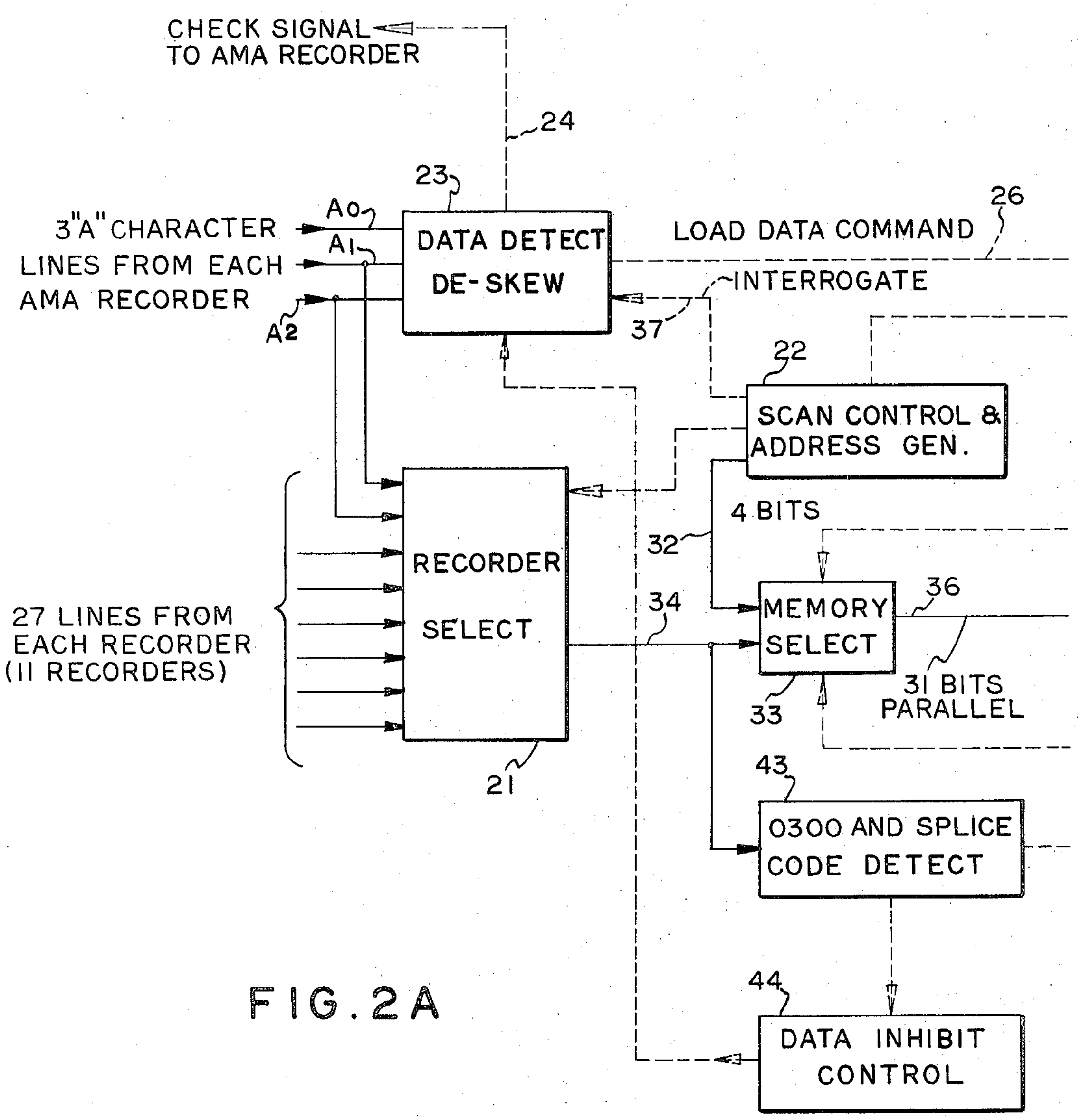
FIGS. 2A and 2B are a block diagram of a system incorporating the present invention.
Figure 2B:
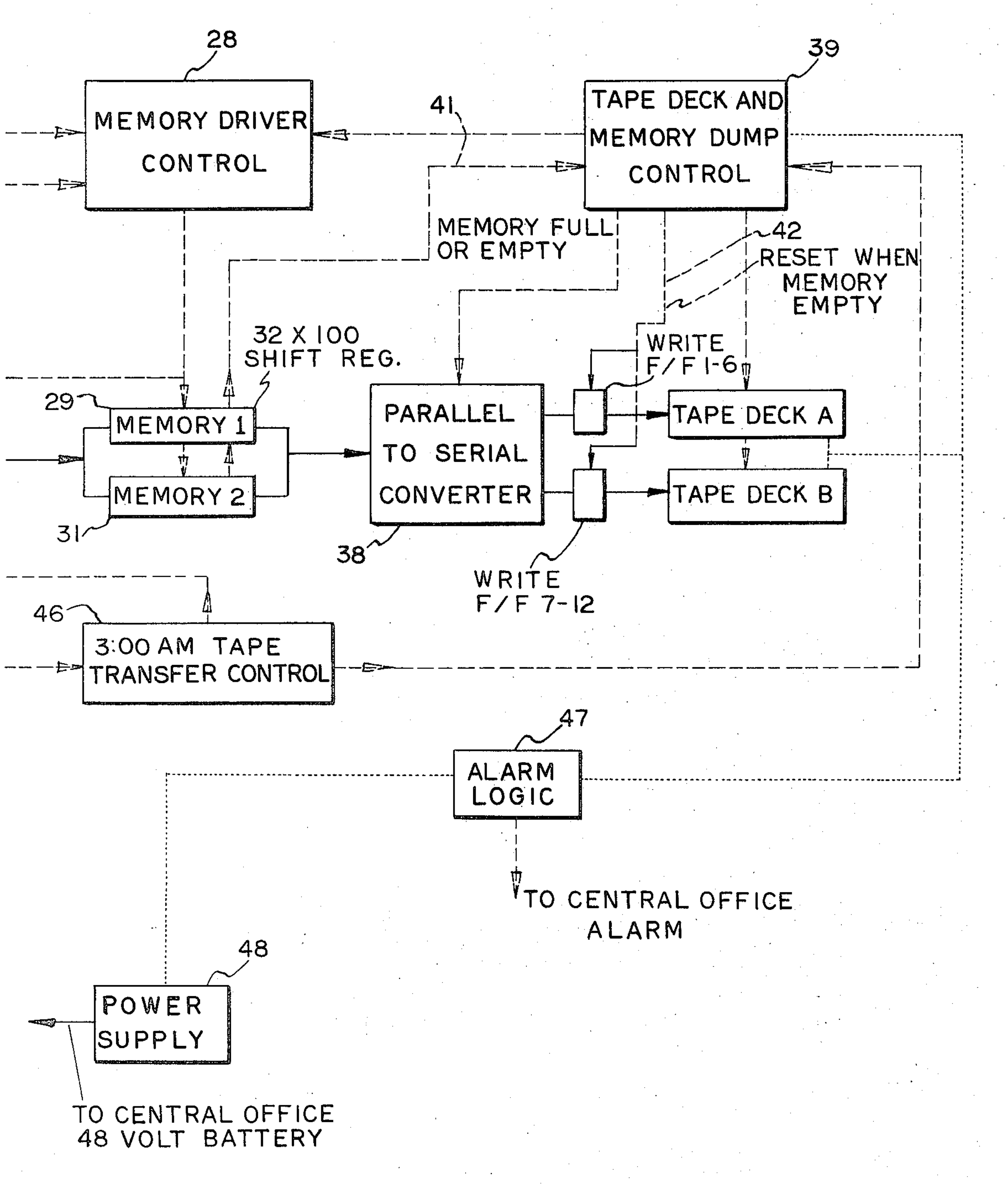

FIGS. 2A and 2B illustrate a block diagram of a system of the present invention which replaces the paper perforator 13. Moreover, it replaces perforators for ten AMA recorders and spare recorder; in other words, eleven recorders. This is accomplished by a scanning technique.

In the block diagrams of FIGS. 2A and 2B data paths are illustrated by the solid lines connecting the blocks, the dashed lines are control signals and the dotted lines are alarm signals. All eleven AMA recorders are coupled in parallel to the recorder select unit 21 which is driven by a scan control and address generator device 22. The three data lines which provide the A character, that is, $A_0$, $A_1$ and $A_2$, are also coupled to a data detect and deskew unit 23. Since the A character has a maximum of four states two data lines are sufficient to provide this information and thus the $A_0$ data line is not coupled to the recorder select unit. This saves space on the multi-channel magnetic tape on which the data is ultimately recorded.

Figure 1:
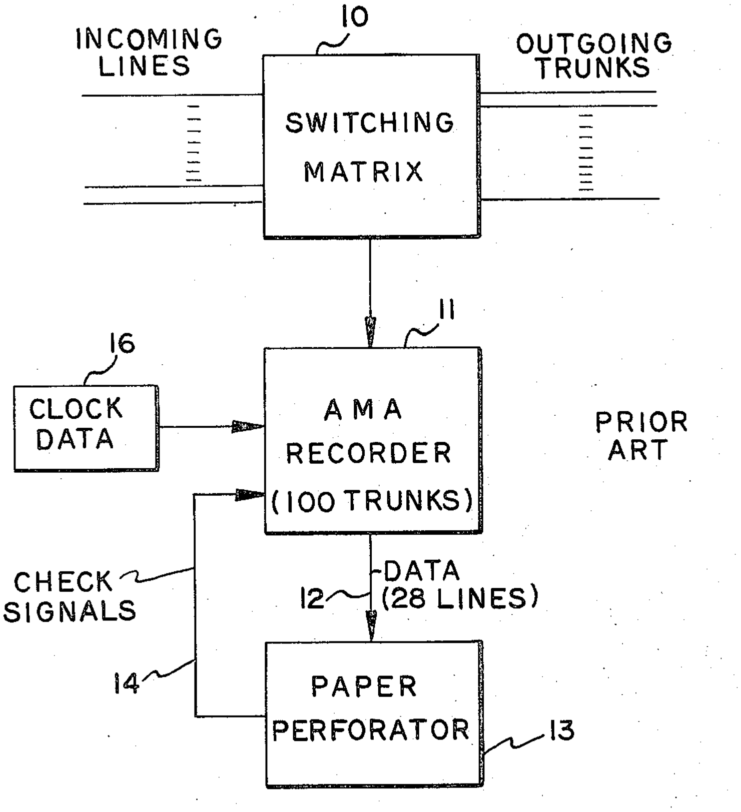
FIG. 1 illustrates a prior art recording system.

A control line 24 which is equivalent to line 14 of FIG. 1 provides a check signal back to the AMA recorder 11.

Data detect and deskew unit 23 also provides a load data command on control line 26 which is coupled to a memory driver control unit 28. This control memory driver unit controls the memories 29 and 31 which each consist of a 32 × 100 bit shift register.

Scan control unit 22 controls recorder select unit 21 to sample the data lines for each AMA recorder unit every 110 microseconds. Thus, the basic cycle time is 10 microseconds. Since the data must be identified as to from which recorder it is derived, scan control unit 22 also generates a four bit address on line 32 which is coupled to a memory select unit 33. Data from recorder select unit 21 is coupled on multiple lines 34 to the memory select unit which selects whether the data is to be coupled into memory 29 or memory 31. Thus, on the output line 36 of memory select unit 33 there are 31 bits of parallel data; 27 bits for the 27 lines from each AMA recorder and four bits for the address generator 22.

Scan control unit 22 would typically consist of a counter providing 11 different codes to activate appropriate AND gates coupled to the 11 AMA recorders. Scan control unit 22 also provides an interrogate pulse on control line 37 to detect unit 23.

Data from either memory 29 or memory 31 is coupled to parallel to serial converter 38 which chops such data into six serial characters corresponding to the data characters A through F. Thus, for example, one character might consist of a four bit address and two bits for the A character. A parity bit is also added at this time and thus seven tracks are written on the magnetic tape included in both tape deck A and tape deck B. The tape decks are coupled to converter 38 through write flip-flops 1 through 6 and write flip-flops 7 through 12, respectively. A tape deck and memory dump control unit 39 provides typical control signals for transferring the data from the shift register memories 29 and 31, converting it from parallel to serial format and storing it on the magnetic tapes of the respective tape decks along with adding the seventh parity bit. In the present invention even parity is used. Some of these control signals include on the line 41 an indication of when the memory is full or empty. An empty indication is when all zeros appear on the memory output. This will be discussed in detail below. When one of the memories is empty, on control line 42 a reset signal resets the write flip-flops 1 through 6 or 7 through 12 depending on which tape deck is being used at that time.

A switch from one tape deck to another occurs as discussed above in response to the command of the AMA recorder unit at 3:00 AM. This is detected by a detect unit 43 which controls a data inhibit control unit 44 to inhibit reception of further data and transfer control unit 46 which provides appropriate control to tape deck control unit 39 and memory select unit 33.

The dotted lines connect appropriate alarm logic 47 which activates the central office alarm in case of failure of the recording on either tape decks A or B or failure of transfer. This alarm logic is activated from power supply unit 49 which is connected to the central office 48 volt battery.

Figure 3:
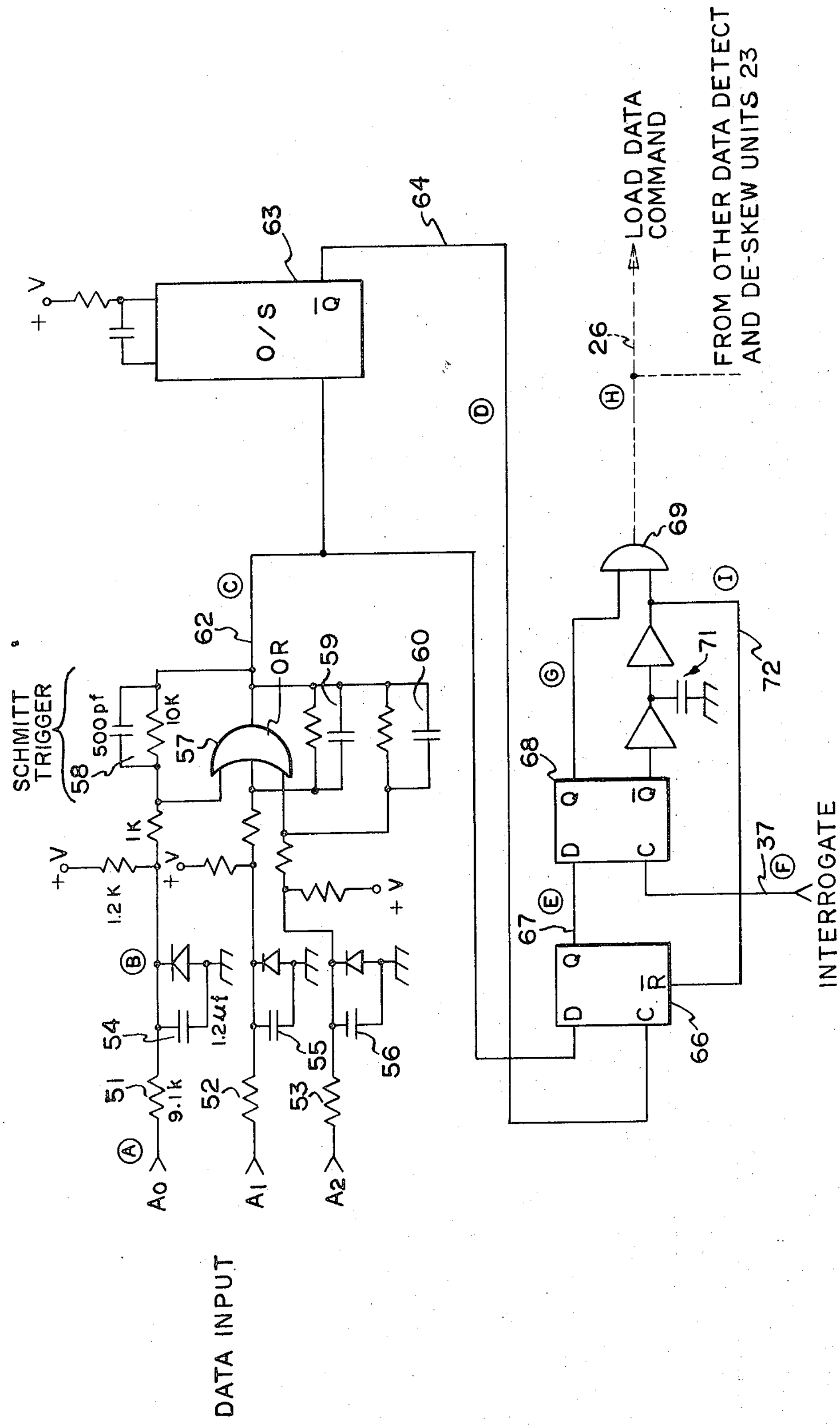
FIG. 3 is a detailed circuit diagram of a portion of FIGS. 2A and 2B.
Figure 4:
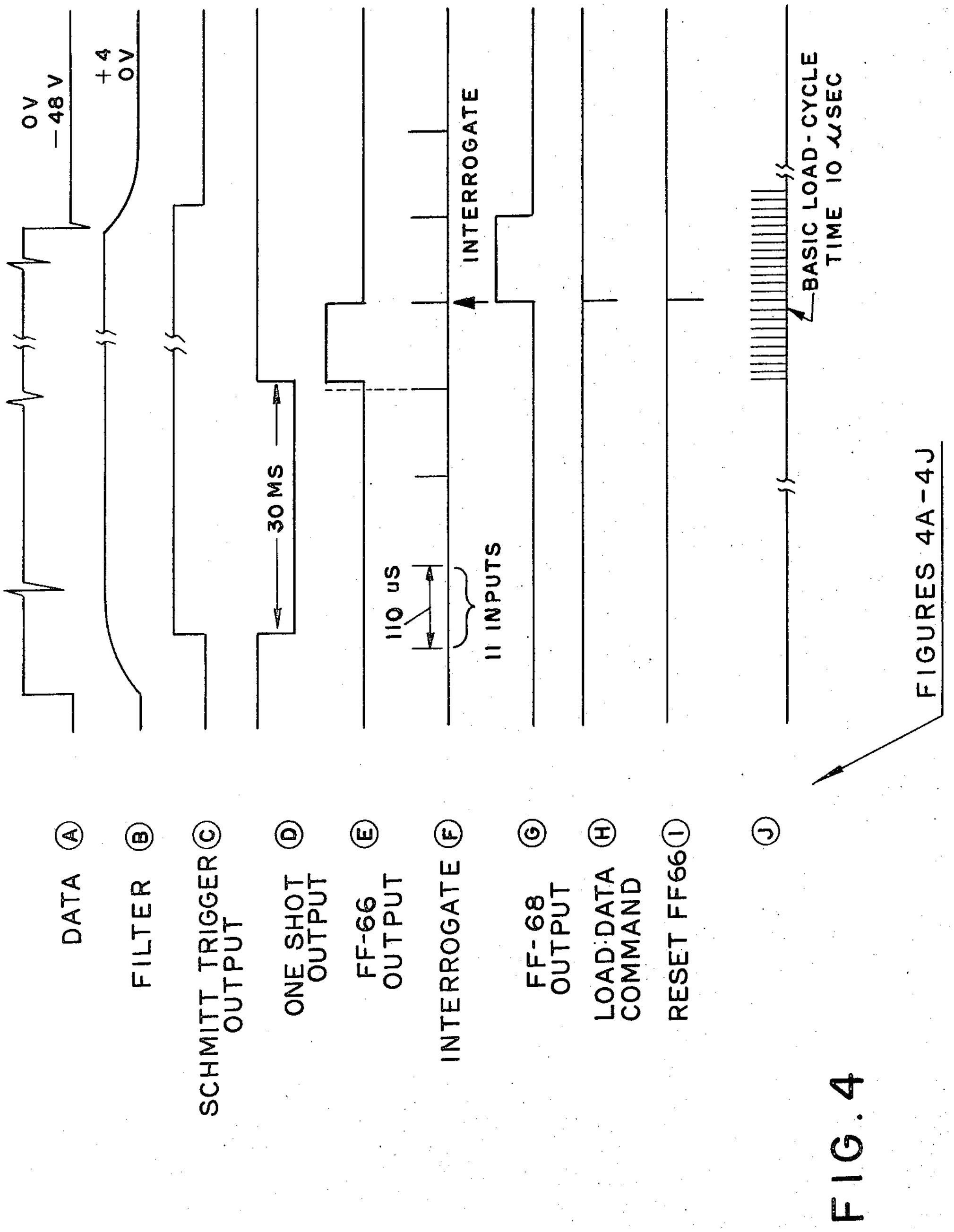
FIGS. 4A through 4J are timing diagrams useful in understanding the operation of FIG. 3.

FIG. 3 illustrates a data and deskew circuit which would be one of eleven circuits coupled to the A character data input lines from the AMA recorders. These inputs are illustrated as $A_0$, $A_1$ and $A_2$. The purpose of this circuit is to compensate for the undesirable qualities of the data which as discussed above is suitable for actuating electromagnetic paper perforators. Noise is present on the data lines which may be many times larger than the actual signal. This noise is of a high enough frequency so that in the prior art circuit as disclosed in FIG. 1 it would not deleteriously affect the electromagnetic paper perforators. However, electronic devices such as transistors in integrated circuits will respond to this information. To remove such noise, the signals are therefore filtered by RC type filters consisting of resistors 51, 52, 53 and capacitors 54, 55 and 56. One side of each capacitor is coupled to ground. The nominal value of the resistors and capacitors are indicated and provide a relatively slow risetime so that as illustrated in FIG. 4B any noise pulse of short duration, even though it may be of substantial magnitude, will not provide a sufficient voltage level to trigger the associated Schmitt trigger unit. This level is approximately 4 volts as indicated. The Schmitt trigger in actuality consists of an OR gate 57 coupled to the three data input lines $A_0$, $A_1$ and $A_2$ through the respective filters and positive feedback loops 58, 59 and 60 between the output of the OR gate on line 62 and the respective input data lines. Thus, as indicated in FIG. 4C and at the point C in FIG. 3, a Schmitt trigger output on line 62 does not occur until the signal at point B reaches a predetermined level.

Another problem involved with interfacing with data suitable for the activation of electromagnets is the relative insensitivity of the electromagnets of the paper perforators to time differences of a few milliseconds on the various data input lines. However, even microseconds are significant from an electronic standpoint. Thus, the data on a given set of 28 data lines must be sampled or strobed in an appropriate time window which may be a few microseconds in length and moreover, this time window must be placed at a time when data, if any, is guaranteed to be present on the 28 data lines. Furthermore, once the data is sampled it must not be accidently sampled again because of the relatively large order of magnitude time difference between the sampling times and the time for which data is present (which, for example, may be from 30 to 100 milliseconds).

In accordance with the foregoing there is provided time delay means in the form of a one-shot multivibrator 63 which produces an output on line 64 designated D of the form shown in FIG. 4D. In the present invention the pulse is of a 30 millisecond duration. Line 62 which has the Schmitt trigger output is coupled to the D input of a first flip-flop 66 which has its C or clock input coupled to line 64. The Q output of flip-flop 66 is coupled on line 67 designated E to the "D" input of a second flip-flop 68 which has its C input driven by an interrogate pulse F. This is obtained from the scan control unit 22 and its interrogate output line 37. There is a separate interrogate line for each of the eleven data detect and deskew units. The Q output of flip-flop 68 designated line G provides one input of an AND gate 69 with its other input being driven by a time delay circuit 71 coupled to the $\bar{Q}$ output of flip-flop 68. This input is also coupled back to the reset input of flip-flop 66 on the line 72 designated I.

The operation of the circuit of FIG. 3 is more clearly understood by reference to the timing diagrams of FIGS. 4A through J. As discussed above, the basic load cycle is 10 microseconds as shown in FIG. 4J meaning that eleven data lines from eleven AMA recorders can be scanned in the time interval of 110 microseconds. This is illustrated in FIG. 4F where the vertical spikes show the interrogate pulses for one data detector and deskew unit which corresponds to a particular AMA recorder. Detection of input data in the preferred embodiment utilizes the lines $A_0$, $A_1$ and $A_2$ but could theoretically use all 28 data lines or perhaps another selected group. All that is necessary is that one line of the selected group would always have some positive indication of data. Such indication, of course, as illustrated in FIG. 4A is a change on the data lines from the normal −48 volts to a 0 volt level which is a data present indication.

After the signals have been filtered by the respective filters on the data input lines, the Schmitt trigger unit which includes OR gate 57 provides an output shown in FIG. 4C which activates the one shot circuit 63 and at the same time enables flip-flop 66. At this time, flip-flop 68 has its $\bar{Q}$ output high and thus there is a high or true input on the AND gate 69. Upon the expiration of the 30 millisecond interval, the one shot output illustrated in FIG. 4D switches to clock the C input of flip-flop 66 activating the line 67 as shown in FIG. 4E. This enables flip-flop 68 to be sensitive to the next interrogate pulse on line 37 which is illustrated in FIG. 4F. Upon reception of this interrogate pulse on the C input of flip-flop 68, this flip-flop changes condition to provide an output illustrated in FIG. 4G to produce a coincidence condition in AND gate 69. This occurs because of the time delay introduced by unit 71. The load data command on line 26 as illustrated in FIG. 4H activates the memory driver control unit 28 illustrated in FIGS. 2A and 2B to load the appropriate memory unit. Shortly thereafter as determined by time delay unit 71 a reset pulse occurs on line 72 as illustrated in FIG. 4I to reset flip-flop 66.

Flip-flop 66 cannot again be actuated even though output data remains on line 62 since the enabling one shot signal on line 64 cannot again occur until line 62 changes state from a no data state to a data present state. This will not occur until that particular line of data is removed from the data detect and deskew circuit and a new line of data presented.

The one-shot unit 63 provides for further noise rejection since any noise that is sufficient to trigger the Schmitt trigger and therefore the one-shot must be of a duration equal to or greater than the timing duration of the one-shot multivibrator.

By means of the load data commands, memory driver unit control 28, referring to FIGS. 2A and 2B, loads one of the selected memory units 29 or 31 with the 31 bits of parallel data until that memory is full. During this loading of one memory the other memory transfers the data to parallel to serial converter 38 and this data is recorded on the selected tape deck.

The magnetic tape generated by the present system is readable by the IBM 2400 series, 7-track, magnetic tape transport. In order to meet the self-checking requirements of the 2400 series, the block of data must be recorded in even vertical parity, even longitudinal parity and NRZ1 format. The vertical parity is met on a character by character basis. Longitudinal parity is accomplished at the end of writing a block of data and is part of the inter-record gap when recording in the normal manner. However, when recording the tape in a reverse mode opposite from the direction in which it will be read, the longitudinal redundancy check character (LRC) must be recorded before the remainder of the data. Thus, it is a pseudo type of character.

Figure 5:
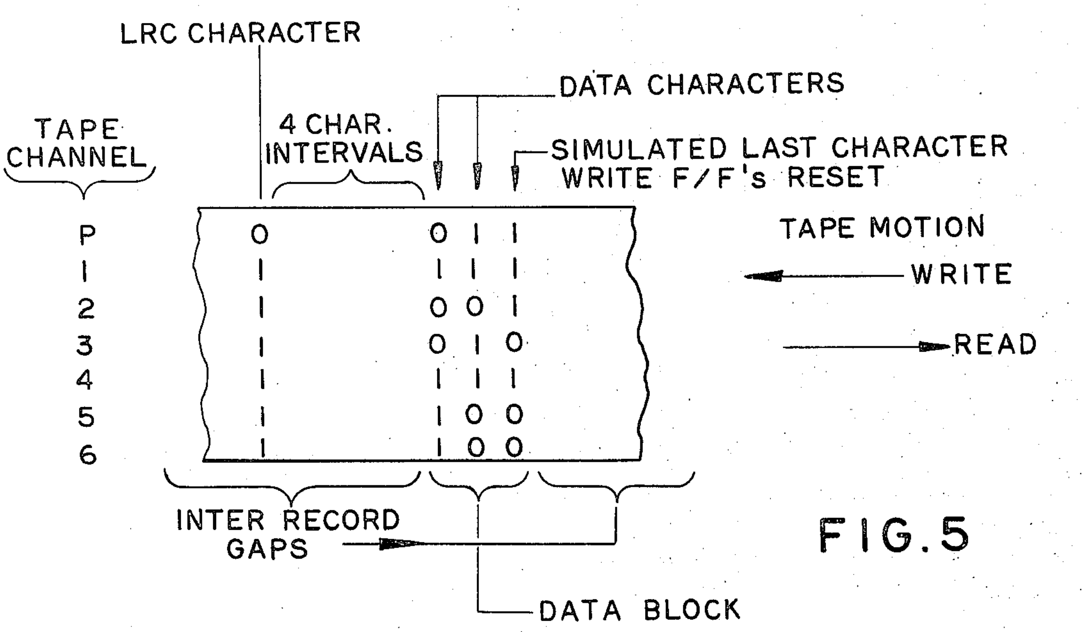
FIG. 5 is a schematic representation showing how data and other information is recorded on the magnetic tape used in the present invention.

The foregoing is illustrated in FIG. 5 where the LRC character includes ones in six of the channels or tracks with a zero parity bit in order to provide for even vertical parity. This character is written in the inter-record gap and separated from the data block by four character intervals. After the four intervals data characters are placed on the tape. In the illustrated embodiment two data characters are illustrated. One character after the last true data character is written for validating the earlier LRC character; in other words, for providing even longitudinal parity. From inspection of FIG. 5 it is clear that this parity has been achieved. Since the last character written is simulated, when the tape is read in the direction indicated it would be the first character read and the tape deck and memory dump control unit 39 by means of its software control eliminates this character.

In order to provide the simulated last character all that is necessary is to reset by means of control line 42 shown in FIGS. 2A and 2B either the write flip-flops 1 through 6 if tape deck A is being used or the write flip-flops 7 through 12. This will provide the proper simulated character which can be intuitively seen from the following. Initially all the flip-flops are set to the same state. This can either be all zeros or all ones. Because of the nonreturn to zero recording technique, which is commonly used in recording on magnetic tape, transitions will only occur when a one is recorded. Thus, if an odd number of transitions occur meaning an odd number of "1s" is recorded, the flip-flops will be in an opposite state from their initial state at the end of the data block. Resetting will thus provide one additional transition back to the initial starting state to give even longitudinal parity.

From the foregoing technique of generating a pseudo LRC character along with the simulated last character to validate such pseudo character, the magnetic tape can now be read in a reverse manner to be compatible with a standard tape reader and also compatible with the manner in which the previous paper tapes were read. As discussed above, reading the tapes in a reverse manner is, of course, time saving and complies with the program format of reading since the disconnect signal is the first character which is read. If no disconnect signal for that particular trunk is received, then the remaining data on the trunk will not be read since it is an incomplete call.

Thus, an improved system for recording data from an AMA recorder has been provided which utilizes space saving and more efficient magnetic tape for paper tape and still provides for easy switch over to the magnetic tape system without interruption of the system function and provides for exact compatability with existing software.

I claim:

1. A real-time multiplexed digital data recording system for telephone central office automatic message accounting (AMA) recorders, such recorders monitoring a predetermined number of trunks and providing parallel data on a plurality of output lines related to calls placed on said trunks said system comprising: means responsive to a preselected group of output lines for indicating the presence of data on at least one of said lines; time delay means responsive to said indication of the presence of data for providing a load command a predetermined time after said indication; and memory means for sampling and storing said parallel data from all of said plurality of output lines in response to a load command from said time delay means said sampling of said data occurring in a time interval which is relatively short compared to said predetermined time of said time delay means.

2. A system as in claim 1 together with scanning means for sequentially sampling data from a plurality of AMA recorders.

3. A system as in claim 1 where said means responsive to a preselected group of data lines includes filter means having a relatively slow risetime for preventing spurious noise pulses from giving false data indications.

4. A system as in claim 3 where said filter means includes an RC circuit.

5. A system as in claim 3 where said means responsive to a preselected group of data lines includes Schmitt trigger means coupled to said filter means for providing an output signal during the presence of data on any of said group of data lines.

6. A system as in claim 1 where said means responsive to a preselected group of data lines includes Schmitt trigger means for providing an output signal only during the presence of data on any of said group of data lines and includes flip-flop means enabled by said output signal and reset by said load command.

7. A system as in claim 6 where said flip-flop means is activated by said time delay means.

8. A system as in claim 1 where said time delay means is a one-shot multivibrator.

9. A system as in claim 1 where said predetermined time is 30 milliseconds.

10. A system as in claim 1 together with multichannel recording means including magnetic tape for recording said data stored in said memory means, said recording means including means for recording a pseudo longitudinal redundancy check (LCR) character on said magnetic tape, for use when said tape is read in a reverse direction, and for later recording a simulated data character on said tape for validating said LRC character when said tape is read in a reverse direction.

11. A system as in claim 10 where said means for recording said simulated data character includes a plurality of write flip-flops associated with the channels of said recording means for writing on said magnetic tape, means for setting all of said flip-flops to the same state for providing said LRC character and means for resetting said flip-flops in response to the last character of true data to provide said simulated data character.

12. A real-time multiplexed digital data recording system for telephone central office automatic message accounting recorders, such recorders monitoring a predetermined number of trunks and providing parallel data on a plurality of output lines related to calls placed on said trunks said system comprising: means for sampling and storing said parallel data; multi-channel recording means including magnetic tape for recording said data stored in said memory means said recording means including means for recording a pseudo longitudinal redundancy check (LRC) character on said magnetic tape, for use when said tape is read in a reverse direction, and for later recording a simulated data character on said tape for validating said LRC character when said tape is read in a reverse direction.

13. A system as in claim 12 where said means for recording said simulated data characters includes a plurality of write flip-flops associated with the channels of said recording means for writing on said tape, means for setting all of said flip-flops to the same state for providing said LRC character and means for resetting said flip-flops in response to the last character of true data to provide said simulated data character.

14. A system as in claim 12 where said recording means records said pseudo LRC character in the inter-record gap of said tape.

* * * * *